Feb. 14, 1961 R. A. S. TEMPLETON 2,971,843
METHOD OF MAKING AN ANIMAL FEED
Filed July 1, 1957
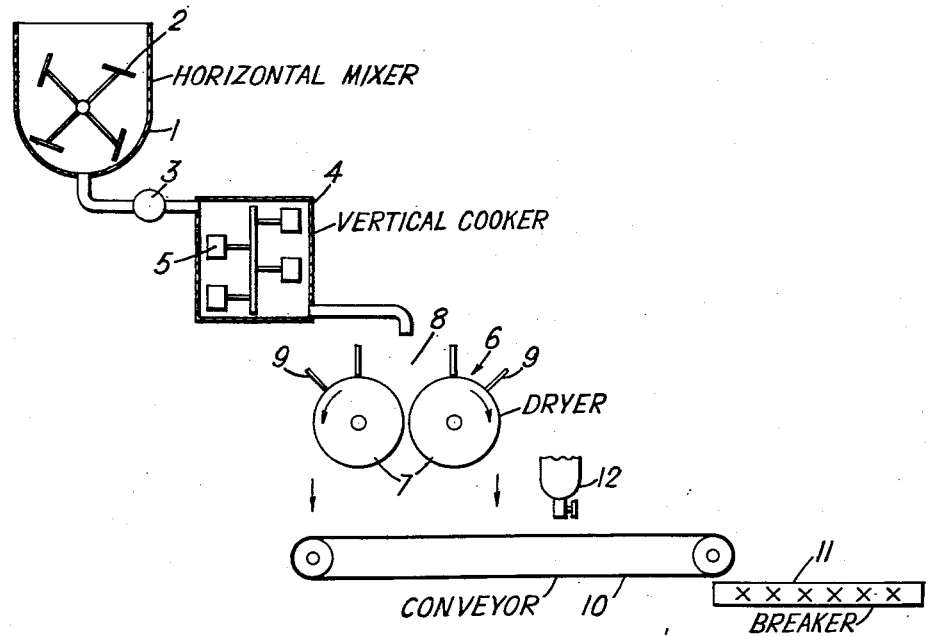
ROBERT A. S. TEMPLETON
*Inventor*
By Wendroth, Lind & Ponack
*Attorneys*

United States Patent Office 2,971,843
Patented Feb. 14, 1961

2,971,843

METHOD OF MAKING AN ANIMAL FEED

Robert Alexander Spencer Templeton, Cereal House, 58 Mark Lane, London E.C. 3, England Filed July 1, 1957, Ser. No. 669,312

Claims priority, application Great Britain July 5, 1956

9 Claims. (Cl. 99—2)

The present invention relates to the manufacture of foodstuff.

In the feeding of animals—especially baby animals—there has been in operation for many years a constant endeavor to improve the efficiency of foods for the promotion of growth and/or flesh.

This endeavor has extended to the point of producing milk replacement foods—that is to say, products capable of replacing wholly or in part the natural liquid milk food of the baby animal—and such products are normally made available to the farmer or feeder in the form of dry powders which may be reconstituted with warm water into milk-like liquids which the baby animals then drink in substitution for the mother's milk.

The workers engaged therein are constantly searching for ways and means to improve upon and/or to reduce this first milk feeding period (liquid) which generally extends for several weeks of the life of the baby animals, in order to limit or avoid the difficulties of liquid feeding—such as keeping clean all utensils, etc., and mixing of liquids. As an outcome of these further endeavors specially balanced foods composed of a number of ingredients are now available which claim greatly to reduce the liquid feeding period, or alternatively to improve upon the feeding results obtained during this period, by making it possible for farmers to feed the baby animal advantageously on dry foods at a much earlier age than has been in the past considered to be advisable.

The method of use of such products is that they are normally fed dry either in reduction of and substitution for milk replacement, or natural whole milk, or as complements to be fed alongside either. The characteristic of such products is that they are generally composed of a number of ingredients, say from five to twenty-five ingredients, which are very carefully blended and balanced in accordance with the known requirements of each class of baby animals. In this way the precise needs of each class of baby animals can be made available in terms of, for example proteins, carbohydrates, oils, minerals, vitamins and other beneficial factors. Since the products described may contain from say five to twenty-five ingredients, thus, for example, maize meal, wheat meal, barley meal, oat meal, fish meal, meat meal, blood meal, bone meal, limestone flour, salt, and the like, it is obvious that the products can be adapted also for particular purposes even within one class, for example, baby calves; thus, it is possible to devise a product favoring the growth of frame and bone and/or another product favoring the formation of fat whilst retarding the growth of frame or bone.

I have noticed that in all these endeavors which have given rise to considerable progress, that there are nevertheless difficulties preventing consistently good results, especially when feeding the dry products to very young baby animals—for example, calves, piglets, puppies, lambs and the like—especially in their first weeks of life, and I attribute these difficulties in varying degrees to the following known disadvantages of the products already available which I have described.

(1) The ingredients out of which these products are composed by careful blending are almost invariably raw ingredients and tend to be relatively indigestible in the stomach of the baby animal. Thus, raw maize meal, raw wheat meal, raw fish meal and the like.

(2) The ingredients tend to have different particle sizes either because of the separate milling or grinding which may have been applied to each, or because the original whole product, thus maize compared with oats, tends to fracture when being ground in a different manner and so, even if an identical mill or grinder be used for both products, there will be produced a considerable variation of particle size between the two ground products. In consequence, as is well known, a blended product after mixing, however carefully done, can and often does re-grade in course of transportation or storage with the result that a normal sized container of say 112 lbs., of such a product having been exactly blended initially to a precise requirement of protein, oil and minerals, may be found later to vary quite significantly in the values of these food factors as between the top and the middle and the bottom of the 112 lb. container. It will be obvious that a product having this variation will produce less than optimum results when fed to animals of any age, but when fed to baby animals in the first days or weeks of life the disadvantage is emphasized by the delicacy of the stomach when life is very young.

Undoubtedly steps can be and are taken to limit this second disadvantage, but it is a constant disadvantage inherent in the existing known dry mixing or blending process.

In accordance with the present invention these two major disadvantages and perhaps some others are overcome by subjecting the initial ingredients to a process of controlled soaking and/or cooking in a sufficient quantity of water prior to drying thereof, for example into the form of dry powder, flakes or pieces.

By "soaking" I mean the immersion of the mixture of ingredients in a quantity of water which should not be less than 50% by weight of the total weight including the water for a time sufficient to ensure that the water soluble factors of the various ingredients shall have become to a significant extent dissolved by the water and either by the absorption of the solution so formed into the relatively dry cells of the ingredients or by adherence at their surfaces (after drying) to secure in this way a mixture of a number of ingredients which are incapable of being or becoming re-graded.

In further explanation of this step of soaking, I mention that if a simple mixture of maize meal, wheat meal, blood meal, dextrose, salt and limestone flour is immersed in a sufficient quantity of water for an appropriate time, the water soluble factors, notably the salt, the dextrose and the blood, will pass into a compound solution and in the manner already described will form before or during the course of drying a product which is incapable of being re-graded in the sense that products heretofore known have been re-gradable.

I have found that the time required for this essential redistribution of water soluble factors varies with the quantity of water used. Thus, if the mixture is adjusted to contain say 80% water, some redistribution may be obtained in five minutes, but thirty minutes or even sixty minutes is preferable. To obtain the best commercial results I have found that the initial ingredients together with 70% to 80% by weight of water should be soaked, and preferably stirred during the soaking step, in a suitable mixing apparatus for a period of one hour.

It will be obvious that this step of soaking offers the additional optional advantages, namely that it is possible to select the most favorable temperature for the redistribution of the water soluble factors. Likewise it is possible in the course of this step of soaking to procure similtaneous helpful actions, for example enzyme actions, by the maintenance of a temperature most favorable to the action of the natural enzymes present in the original ingredients or of enzymes whihc may be added at will. By these means when operating this particular step at a temperature of 90° F. to 100° F. I have found it is possible to secure a marked degree of effective pre-digestion as for example in the conversion of raw starches into sugar forms and in the conversion of proteins.

I have found further advantage in the operation of this step in the sense that the addition of ingredients themselves in liquid form, thus fats, molasses, fish solubles, which present some difficulties in the dry mixing process may be added in the case of the present invention either prior to or in course of the soaking step with the greatest of ease and convenience.

By "cooking" I mean the raising of the temperature of the mixture after the soaking step to a level and for a time required to secure substantial gelatinization of starches and to promote the conversion of the proteins. For this purpose I have found a temperature of the order of 180° F. convenient for commercial operation with a time factor at such temperature not generally less than fifteen minutes. The quantity of water which must be present in the mixture during the cooking step must in order to secure the most favorable results, be a minimum of 50% by weight.

It is obvious that cooking step permits optional alternatives which in some cases are beneficial. For example, the temperature can be raised to such a level as will inactivate the enzymes natural to the original ingredients or added to the mixture and thus stop at any desired point of time further enzymic breakdown. In the same way the product by sterilization may be rendered completely free of infectious or harmful bacteria which frequently lie present in the original ingredients, especially when when these are, as often happens, stored for long periods of time, more likely than not overseas, possibly at tropical temperatures. For either of these purposes, namely inactivation of enzymes or sterilization of bacteria, I have found it best to use a temperature in the course of the cooking step at or close to 212° F. and to extend the time by holding at this temperature for say a minimum of thirty minutes.

Both at the commencement of the cooking step and at the end of the soaking step the product has the appearance of a gruel or porridge thicker or thinner according to the amount of water present above the 50% minimum. The effect of the cooking step is to render the product slightly more viscous because the water will have partially entered the colloid state in the process of absorption and gelatinization.

The drying of the product to remove the water originally added for the purpose of securing the objective described may be carried out in a variety of ways. For example, the wet porridge-like product having a minimum of 50% by weight of water may be rolled into a sheet and pressed or formed into figures or shapes convenient for air drying by traditional warm air currents, or, as I prefer, the product may be fed onto a standard steam heated cylinder or a pair of cylinders which will pick up a film or the product and in the course of rotation will dry it out satisfactorily into thin paper-like sheets which come away at the customary doctor knife. These sheets easily break down into flakes which may be coarse or fine according to the rate of feed and rotation of the steam heated cylinder. After mild cooling these flakes are ready for packing and afterwards delivery and consumption.

The result is a dry product the separate ingredients of which cannot be re-graded having been in the course of the process partially dissolved and reformed, and, if subjected to the soaking step at suitable temperatures and the cooking step, also partially pre-digested and pre-cooked in the presence of water, freed of bacteria destroyed at 212° F. in water, and finally dried.

The following is an example of the performance of my invention, the accompanying drawing indicating diagrammatically the apparatus used. Into a dry food mixer 1, preferably of the horizontal paddle type, having a convenient mixing capacity of 1000 lbs. dry, the following ingredients are fed, namely, 300 lbs. of maize meal,
200 lbs. of barley meal,
200 lbs. of wheat meal,
50 lbs. of fish solubles,
50 lbs. of extracted ground-nut meal,
100 lbs. of molasses,
10 lbs. of salt,
10 lbs. of limestone flour, and
10 lbs. of bone meal, making a total of 930 lbs., of which it can be assumed that approximately one half of the weight of the molasses and the fish solubles is water, say 75 lbs.

The paddle 2 having been brought into operation to effect admixture of the ingredients, I add 1250 lbs. of water so as to obtain a total water content well above the minimum requirement of 50% by weight and the mixing action is continued for a period of one hour. In order to facilitate the action of the natural enzymes the temperature of the contents of the mixer 1 is raised to between 90° F. and 100° F. and held at that point during this period by the admission of steam to the mixer in any convenient manner. A certain small addition to the water content will take place due to the admission of the steam on account of its condensation with the mixture; however, this is unobjectionable.

I then pass the water mixed partially pre-digested content of the mixer which is of a porridge-like consistency, by pump 3 or by gravity to the cooker 4.

Any convenient type of standard cooking equipment may be used as a cooker, for example, a stationary vertical drum provided internally with a rotating paddle 5 and to which steam is fed. Having fed the content of the mixer into the cooker and whilst it is being agitated by the paddle steam is admitted to the cooker and the temperature therein is thereby raised to 212° F. and held at that point for a period of thirty minutes. The admission of the steam produces some further condensation which is not objectionable having regard to the amount of water used.

I then pass the water mixed pre-digested and pre-cooked product now in rather more viscous porridge-like form by gravity or by pump to the hopper 8 of a standard type film drier 6 (sometimes described as a steam heated cylinder). In the drier rotating steam heated cylinder 7 picks up films of the product from the hopper 8 and as the cylinders revolve the water present in the film, or the greater part thereof, is evaporated leaving dry films which are removed from the cylinder by doctor knives 9 in thin paper-like sheets having a residual moisture content of approximately 12% water.

These sheets fall onto a standard type of conveyer 10 preferably perforated on which they are cooled. After cooling the sheets are broken into flakes on a breaker 11 and are then ready for packing and delivery.

Whilst on the conveyer heat susceptible vitamin rich oil and antibiotics may be applied to the paper-like sheets in any convenient manner, for example by means of a drip feed arrangement 12 adapted to deliver one drop per 4 sq. in. of surface area as the paper-like sheets move forward lying fully extended on the surface of the conveyor.

In the foregoing the invention has been described in its application to the production of animal feeding stuff but it is to be understood that it may be applied to the production of foodstuff in general, that is to say, for human as well as animal consumption.

I claim:

1. The method of making a foodstuff which comprises soaking a mixture of food ingredients including ingredients containing starches and proteins in an amount of water which is at least 50% of the combined weight of the food ingredients and water at a temperature below that at which substantial gelatinization of starches and substantial conversion of proteins takes place for at least about thirty minutes to cause water-soluble substances to be dissolved out of the various ingredients and to become admixed with one another in the resulting solution and to form a porridge-like mass, and thereafter drying the resulting porridge-like mass to form a dry product.

2. The method of claim 1 in which the porridge-like mass resulting from the soaking is heated to a temperature not substantially less than 180 degrees until substantial gelatinization of the starches and substantial conversion of the proteins is obtained, before drying.

3. The method of claim 2 in which the porridge-like mass resulting from the soaking is heated to a temperature not substantially less than 212 degrees to bring about inactivation of enzymes present and sterilization of bacteria.

4. The method of claim 3 in which the mixture is maintained at a temperature above normal room temperature during the soaking.

5. The method of claim 1 in which the temperature of the water during the soaking is above about 90 degrees F. and the soaking is continued until a substantial degree of pre-digestion of the food ingredients has taken place.

6. The method of claim 1 in which the mixture is soaked for a minimum of one hour.

7. The method of claim 1 in which the amount of water during the soaking is not less than 70% of the combined weight of the food ingredients and water.

8. The method of claim 1 in which the porridge-like mass, during drying, is formed into a sheet and the resulting sheet is broken into small particle form.

9. The method of claim 1 in which at least some of the different ingredients include water-insoluble constituents, and during the drying, the dissolved and admixed water-solubles of the resulting solution are combined with the water-insoluble constituents of the different ingredients.

References Cited in the file of this patent

UNITED STATES PATENTS

| | | |
|---|---|---|
| 45,180 | Schenck | Nov. 22, 1864 |
| 1,057,215 | Bohrmann | Mar. 25, 1913 |
| 1,990,329 | Johnson et al. | Feb. 5, 1935 |
| 2,358,250 | Rogers et al. | Sept. 12, 1944 |